United States Patent [19]

Casper et al.

[11] Patent Number: 4,989,323

[45] Date of Patent: Feb. 5, 1991

[54] PORTABLE POWER UNIT FOR VARIOUS POWER TOLLS

[75] Inventors: Kim P. Casper; Rolf Wustrau; J. David Meister, all of Austin, Tex.

[73] Assignee: Caspro Mechanical Technologies, Inc., Austin, Tex.

[21] Appl. No.: 361,279

[22] Filed: Jun. 5, 1989

[51] Int. Cl.5 .......................... B26B 27/00; B26B 7/00; F16C 1/00

[52] U.S. Cl. .................................. 30/296.1; 30/276; 464/52

[58] Field of Search .................... 30/296.1, 276, 273, 30/347, 296.4 R, 276; 464/52, 53, 16, 273

[56] References Cited

U.S. PATENT DOCUMENTS

| | | |
|---|---|---|
| 2,618,940 | 11/1952 | Wyzenbeek ............................. 464/52 |
| 2,790,292 | 4/1957 | Trecker . |
| 3,505,831 | 4/1970 | Palmer et al. . |
| 3,540,123 | 12/1967 | Yamada .............................. 30/296.1 |
| 3,611,748 | 10/1971 | Wallgren . |
| 4,057,114 | 11/1977 | Anderson . |
| 4,098,292 | 7/1978 | Evans . |
| 4,213,482 | 7/1980 | Gondek . |
| 4,242,855 | 1/1981 | Beaver, Jr. . |
| 4,341,017 | 7/1982 | Janczak . |
| 4,451,983 | 6/1984 | Johnson et al. . |
| 4,483,070 | 11/1984 | Junkermann ......................... 30/276 |
| 4,541,160 | 9/1985 | Roberts . |
| 4,574,481 | 3/1986 | Ericsson .............................. 30/296.1 |
| 4,644,654 | 2/1987 | Howe et al. ......................... 30/296.1 |
| 4,653,254 | 3/1987 | Qualls . |
| 4,664,420 | 5/1987 | Demeri . |
| 4,696,108 | 9/1987 | Zerrer et al. ........................ 30/276 |
| 4,733,471 | 3/1988 | Rahe .................................... 30/276 |

Primary Examiner—Douglas D. Watts
Assistant Examiner—Paul M. Heyrana, Sr.
Attorney, Agent, or Firm—Kirk & Lindsay

[57] ABSTRACT

The present invention is directed to a portable power unit for use with various power tools.

20 Claims, 4 Drawing Sheets

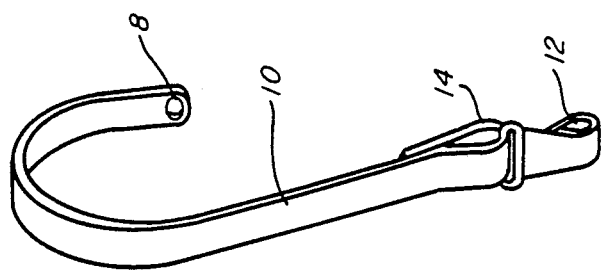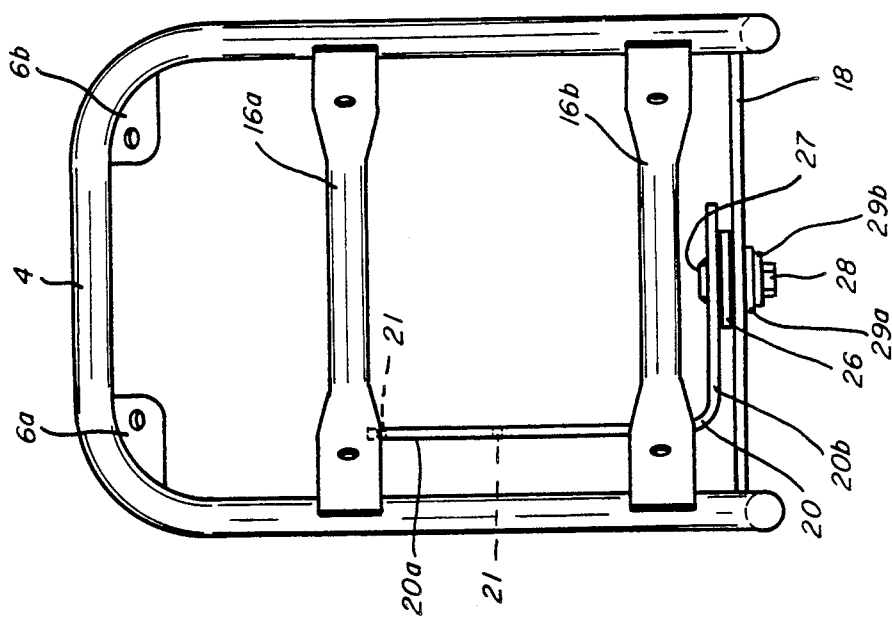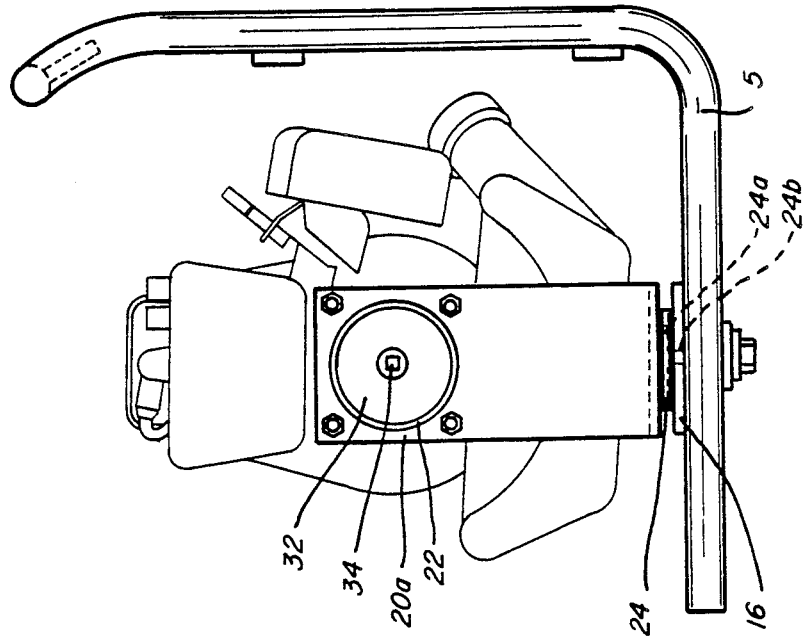

PORTABLE POWER UNIT FOR VARIOUS POWER TOLLS

FIELD OF THE INVENTION

The present invention is directed to a portable power unit for use with various power tools.

BACKGROUND OF THE INVENTION

U.S. Pat. No. 4,451,983 discloses a flexible drive shaft with a drove head which fits into a drive socket. A shroud is turned to align a set screw with the threaded opening to attache the coupling. A power handle assembly is attached to a flexible drive shaft. The flexible drive shaft powers a rotary tool. A tubular liner covers the flexible drive shaft.

U.S. Pat. No. 2,790,292 discloses a rigid shaft with a key and a set screw for attachment to an elbow coupling. The combination has a motor with an output shaft. There is a right angle drive mechanism which transmits rotatable power to a flexible drive shaft. A hand grip is connected to the flexible drive shaft. Portable hand tools can be connected to the flexible shaft.

U.S. Pat. No. 4,341,017 discloses a guide bar mounted on the end of a handle provided with a throttle trigger. A harness carries a drive unit which conducts oil to lines which run through the guide bar to a hydraulic motor which runs a sprocket wheel to drive a saw.

U.S. Pat. No. 4,483,070 discloses a trimmer cutting head mounted on a rod which extends from pistol grip control handle with a second handle midway on the rod for control. The trimmer cutting head is suspended from a cord which is mounted on a backpack extension. The backpack carries a gasoline engine powered alternator connected to a pair of mount brackets secured to the backpack. The pistol grip handle has a trigger switch which is in circuit with a cutting head motor. The cutting head motor is attached to the trimmer cutting head.

U.S. Pat. No. 3,540,123 discloses a frame to be carried on the back of an operator. The frame has upper and lower mounting plates, a mounting pivot and straps. A control lever is also attached to the frame. A coupling connects the engine to a flexible cable. There are flexible tube portions surrounded by rubber like plastic coverings. A rigid central pipe section is fitted in between the flexible tube sections and has handles. The flexible tube is threaded to a housing which in turn is threaded to a bearing housing. A collar is secured to the housing by clamp screws. The flexible cable has a male end which fits into a square cross section of a sleeve coupling member.

U.S. Pat. No. 4,242,855 discloses a lawn mower engine with an adapter for clipping to a flexible cable mounted within a housing. The flexible cable has an extension for slipping into a rotatable drive. The driver has a square end for fitting into a socket on the end of a second flexible cable within a trimmer. The driver is positioned within the end of the handle of the trimmer.

U.S. Pat. No. 4,098,292 discloses a quick disconnect coupling for detachable connecting a pair of fluid conveying conduits. The coupling 20 is comprised of a female body member 21 and a second tubular or male body member 22. Surrounding the female body member 21 is a locking collar 42 for movement so that when in locking position it forces the restraining balls 44 into an annular recess 31 to interconnect the male body member 22 with the female body member 21.

U.S. Pat. No. 4,541,160 discloses a rotatable flexible shaft for coupling one of several driving members to one of several driven members. The flexible shaft is adaptable as a coupling for any one of many driving members to any one of many driven members wherein the members may have output and input shafts, respectively, of varying sizes. Different adapters may be used to provide the coupling to the different size shafts.

U.S. Pat. No. 4,653,254 discloses a motor-driven lawn and garden device which provides the power source for lawn and garden equipment. The lawn equipment may be a trimmer which is connected by a flexible drive shaft and connected to the trimmer shaft. The patent discloses the connection of the drive shaft to the power driven drive shaft 16 of the lawn mower.

U.S. Pat. No. 4,213,482 discloses a detachable hydraulic coupler which includes a male and female portion. The section of the female portion inclosing the male portion includes a series of locking balls slidable in apertures which extend into a groove in the male portion to lock the coupler portions together. A slidable collar encircling the female portion normally holds the locking balls in locking position.

U.S. Pat. No. 3,611,748 discloses a male ended quick convert flexible drive shaft structure which is particularly adapted for use with an electronic equipment repair and maintenance unit. The male end assembly 70 has two grooves 80 and 90 spaced apart a distance such that when the spring loaded ball 35 is in groove 90 the flexible drive shaft is connected to the motor. On the other hand, while the motor 12 is still running, the flexible drive shaft can be placed in a non-operating drive while the male member is still fixed to the motor housing panel by having the spring loaded ball 35 in the groove 80.

U.S. Pat. No. 4,057,114 discloses a flexible shaft connected directly to the crank shaft of a snowmobile engine by a coupler. The flexible shaft is used to drive an ice auger bit. Attached to the flexible shaft is a reduction gear which rotates the drive shaft of the ice auger bit at a substantially reduced speed.

U.S. Pat. No. 3,505,831 discloses a flexible shaft coupler. The flexible shaft coupler disclosed eliminates the use of bearings of any type.

U.S. Pat. No. 4,664,420 discloses a female pneumatic coupling that releasibly engages a groove nipple attached to a pneumatic tool. The locking sleeve has a series of combination locking tumblers which must be rotated to a preselected number so that the locking sleeve may be moved to deactivate the ball bearing latch. Removal of the tool attached to the groove nipple is prevented therefore unless the persons knows the combination of the selected numbers of the locking tumblers.

BRIEF DESCRIPTION OF THE DRAWINGS

FIG. 2 is a side view of the power unit mounted on the backpack.

FIG. 3 is a front view of the backpack.

FIG. 4 is a view of a strap of the present invention.

Summary of the Invention

The invention disclosed herein is directed to portable apparatus for operating power tools. The portability of the apparatus is made very convenient since the entire apparatus can be carried on the back and in the hands of the operator. Another advantage of the portable apparatus is that the operator can quickly attach and detach a variety of power devices through the utilization of the quick coupling disclosed herein. Depending upon the power device to be attached the coupling can either be fabricated to allow or restrict rotation of the power device. The operator can also use various control mechanisms to control the rotational drive transmitted to the power devices. The control mechanisms are functional as well as safety features. The coupling is also made safe when the coupling is detached since no moving parts are exposed.

Accordingly, the present invention relates to portable apparatus for operating power tools. The portable apparatus includes a backpack, a power unit mounted on the backpack, a flexible cable connected at one end to the power unit, a drive coupling connected to the other end of the flexible cable and a driven device which includes a driven coupling to be driven by the drive coupling. The drive coupling and the driven device include a male attachment and detachment and a female attachment and detachment member, respectively. The female member has a locking ball for attachment to and detachment from a groove located on the male member. The driven device may be a power tool, an extension member or any other device to be driven.

The backpack includes a frame, a pivotal mount attached to the frame, frame supports, two shoulder straps attached to the backpack and a power unit mounted on the pivotal mount. The pivotal mount is accomplished through an L-shaped bracket attached to the power unit along the vertical portion of the L while the horizontal portion of the L is pivotally mounted on the backpack. The power unit may also include a clutch so that when the power unit is idling, the output of the power unit will not engage the flexible shaft.

DETAILED DESCRIPTION OF THE PREFERRED EMBODIMENT

Figure 1:
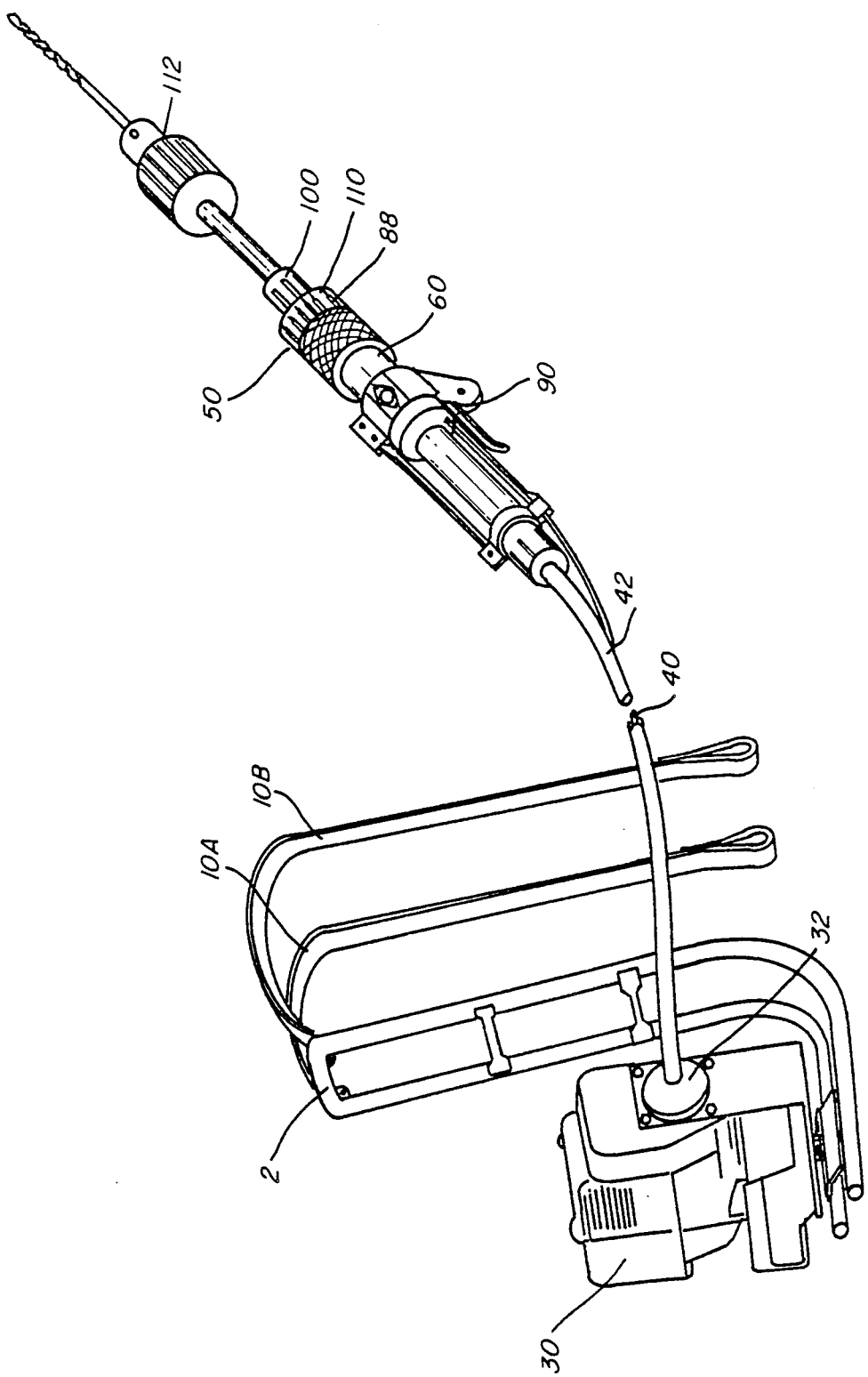
FIG. 1 is a schematic view of a combination including the power unit on a backpack, the flexible shaft, the coupling of the present invention and a power tool.

The present invention provides a portable power unit which may be used not with a single power tool but with any number of power tools or hardware. Referring to FIG. 1, the portability is provided by a backpack 2. Any number of backpacks may be used and the one shown is only exemplary. A power unit 30 is pivotally mounted on the backpack 2. The power unit or motor 30 may be a gasoline engine or electric motor which transmits rotational drive via clutch 32 to a flexible shaft 40. The flexible shaft 40 is covered by a sheath 42. The other end of the flexible shaft is quickly attachable to and detachable from a power tool or driven device 112 through coupling 50. Coupling 50 has a drive coupling 60 which is engaged by the flexible shaft 40 and a power tool coupling 100 which is either attached to or part of the power tool 112. The drive coupling and the power tool coupling may include interlocking lugs 88 and 110, respectively, which mesh to restrict rotational motion between the drive coupling 60 and the power tool coupling 100. The drive coupling 60 may also include control mechanisms 90 for controlling the power tool 112 and the torque delivered by the power unit 30.

The backpack 2 has a frame 4 designed to distribute weight across the back of the operator and particularly to distribute weight to the small of the back of the operator. The frame as shown in FIG. 2, is constructed from a single bar. The top portion of the bar includes a slight bend away from the shoulders, neck and head of the operator who will be carrying the backpack. As shown in FIG. 3 the bar, has two 90° bends at the top portion of the frame. The lower portion of the frame also includes two 90° bends in the bar to form a horizontal portion 5 of the frame 4 to be utilized in the mounting of the power unit 30.

Referring again to FIG. 3, the upper portion of the frame 4 includes two attachment points 6a and 6b for the attachment of shoulder straps 10a and 10b. Two ribs 16a and 16b are attached to the frame bar 4 by any suitable means such as welding. The two ribs 16a and 16b add support to the frame 4 and are spaced apart to stabilize the upper portion and the lower portion of the frame 4. A lower support 18 is attached to the horizontal portion 5 of the frame 4 through any suitable means such as welding. The lower support 18 also adds support to the frame 4. It is to be understood that any number of ribs and lower supports may be utilized in the frame 4 in order to add stability to the backpack 2.

The backpack 2 is mounted on the back of the operator utilizing shoulder straps 10a and 10b as seen in more detail in FIG. 4. The upper end 8 of the shoulder straps 10a and 10b are attached to attachment points 6a and 6b through the utilization of any common fastener. The bottom portion of the shoulder straps 10a and 10b are clipped or attached to frame 4 by any well known clip or fastener. Clip 12 is shown in FIG. 4 attached to lower end 14 of shoulder strap 10.

The lower support 18 has a hole through its center to be utilized for the mounting of the power unit 30. Lower support 18 is located along the horizontal portion 5 of the frame 4 at a position which will create a buffer zone between the power unit 30 and the back of an operator carrying the backpack 2 for obvious safety reasons and for functional reasons such as to allow for pivoting of the power unit 30.

As shown in FIGS. 2 and 3 an L-shaped mounting bracket 20 is used for mounting the power unit 30 on the backpack 2. Bracket 20 has an upper portion 20a and a lower portion 20b. The upper portion 20a of the bracket 20 includes holes 21, preferably four; for attaching the mounting bracket 20 to the power unit 30. The upper portion 20a of the bracket 20 also includes a larger hole 22 located between the four smaller holes 21 just described. The larger hole 22 allows the clutch housing 32 to protrude for attachment of the flexible cable 40.

As shown, the bracket 20 is constructed from a piece of material bent at a 90° angle. However, the bracket could also be constructed from two plates attached together along their edges by welding or other suitable attachment means to form a 90° angle between the two plates.

Power unit 30 is pivotal in relation to backpack 2 as described below. The lower portion 20b of the bracket 20 has a hole 23 to be utilized for pivotal mounting of the bracket 20 to lower support 18. A finger-flex mounting piece 24 and a plate 26 will be situated between the bracket 20 and the lower support 18 to aid in the pivotal relation. The finger-flex mounting piece 24 has an upper annular portion 24a and a lower annular portion 24b constructed of a smaller diameter than the diameter of the upper annular portion 24a. The plate 26 and the lower support 18 both have holes with a slightly larger diameter than the diameter of lower annular portion 24b of finger-flex mounting piece 24. Plate 26 also has a beveled or sunken surface such that when lower annular portion 24b is within the holes in plate 26 and lower support 18, the upper annular portion 24a will be seated within the sunken surface of plate 26. The finger-flex mounting piece 24 has a hole through its center to be utilized for attaching the mounting assembly together as described in more detail below. Finger-flex mounting piece 24 and plate 26 help to support bracket 20 while finger-flex mounting piece 24 minimizes frictional contact area since only the upper portion 24a will serve as the contact surface between the bracket 20 and plate 26. Either or both the fingerflex mounting piece 24 or the plate 26 may be constructed from a material having a low coefficient of friction such as a plastic such as "Nylon" or other suitable material. As shown, the bracket 20, the finger-flex mounting piece 24, the plate 26 and the lower support 18 are attached together by a bolt 27 and lock nut 28 used with washers 29a and 29b or any other suitable means for pinning the apparatus in place. It is to be understood that the power unit 30 could be made pivotal on backpack 2 by any other suitable pivotal mounting mechanism.

As shown in FIG. 2, power unit or motor 30 is a gasoline engine. One such gasoline engine which may be utilized is a "Petco" engine. However, any embodiment of a combustion, an electrical engine or any rotatable drive may be utilized for the invention disclosed herein. For safety and handling reasons power unit 30 is preferably light weight. Power unit 30 may be rotated via the pivotal mounting bracket 20 such that the power output 34 can be located on the right side, left side or any convenient rotational position around the backpack 2. This enables the power unit 30 to be utilized by a right or left handed operator and enables the power output 34 to be positioned for convenient use of the apparatus.

Figure 5:
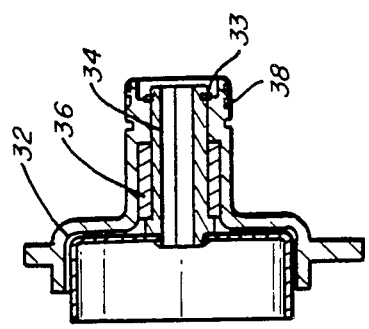
FIG. 5 is a cross-sectional view of a clutch assembly of the present invention.

Clutch housing 32, shown in FIG. 5, is attached to the power unit 30 and includes a power output 34 for receiving and engaging one end of the flexible shaft 40. Power output 34 is a tube with inner dimensions shaped for engaging the male end of flexible shaft 40. The connection to clutch housing 32 may be made through any connector (not shown) which is attached to sheath 42. The connector is preferably similar to connector 44 at the other end of flexible shaft 40 as described herein. The connector may be threadably attached to the clutch housing 32 by means of threading the connector and threads 38 on the outer surface of clutch housing 32. The power output 34 is supported by a bearing 36, preferably a "torrington" needle bearing, and held within clutch housing 32 by a ring 33 preferably "truarc" retaining ring. When the power unit 30 is operated at a low rpm, the clutch mechanism 32 selectively prevents engagement of the power output 34 as will be further described herein. Hence, even when the power unit 30 is idling, the clutch mechanism 32 will prevent engagement of flexible shaft 40 allowing for the safe and easy attachment and detachment of various power tools.

The flexible shaft 40 may be a cable which is formed by a plurality of tightly coiled wires wound around each other with each layer being successively wound over another layer in alternately opposing directions. The flexible shaft 40 may be covered by a flexible or rigid cover or sheath 42 which provides protection and support for the shaft 40 and allows some clearance for the shaft 40 to rotate freely thereby minimizing frictional contact between the shaft 40 and the sheath 42. The motor 30 drives the flexible shaft 40 to provide power through the coupling 50 of the present invention to a power tool 112. The power tool 112 shown is a drill but any number of power tools may be driven with the power source and coupling of the present invention. It is also understood that the portable power unit illustrated in FIG. 1 is only one of many power trains in which the coupling of the present invention may be employed.

Figure 6:
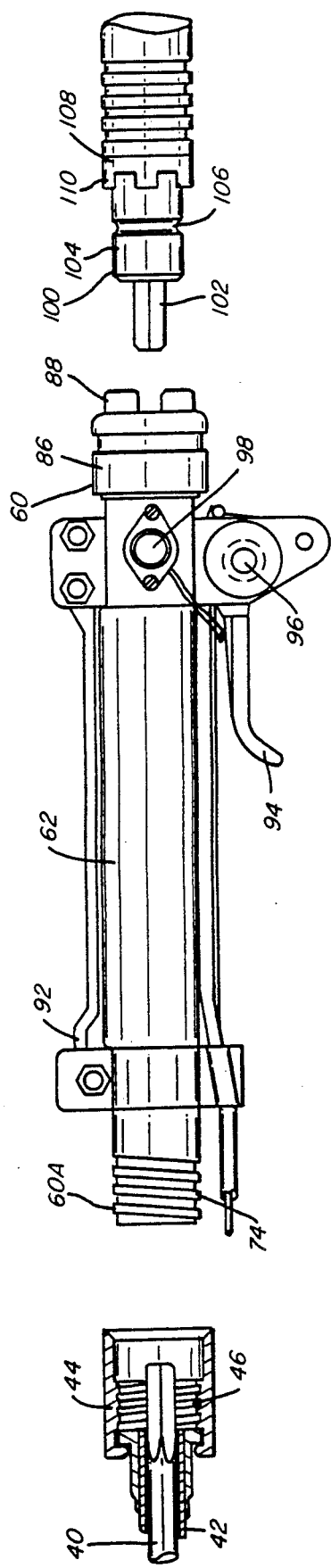
FIG. 6 is a side view partly in cross-section of the coupling of the present invention.

The power unit, whether portable or not, may be used with more than one power tool by using the coupling 50 of the present invention. The coupling 50 provides easy and quick attachment to and detachment from a specific power tool such as a saw, an edger, a drill, a blower, a trimmer, a buffer, or a sander. Referring now to FIG. 6, the coupling 50 is considered to be in two portions. A first portion 60 which is at the end of the flexible shaft 40 opposite the rotating power source or motor 30 is referred to as the drive coupling 60 and the other portion 100 which is associated with the power tool is referred to as the power tool coupling 100. The drive train is therefore initiated at the rotating power source or motor 30 through the flexible shaft 40 and into the drive coupling 60. When the drive coupling 60 is attached to the power tool coupling 100, the power tool may be driven Referring now to FIGS. 6 and 7, the drive coupling 60 of coupling 50 generally comprises a casing 62. The flexible shaft 40, may terminate within the casing 62 or be connected to a rotatable rigid shaft 64 within the casing 62. The casing 62 includes bearing surfaces 66 and 68 to permit free rotation of the rigid shaft 64 within the casing 62. The bearings 66 and 68 are preferably "torrington" bearings. The shaft 64 is retained within casing 62 by retainers 70 and 72 at either end of the rigid shaft 64. The retainers 70 and 72 are preferably "truarc" retainers The flexible shaft 40 which is driven by the rotating power source or motor 30 is preferably attached at the first end 60a of the drive coupling 60 to the rigid shaft 64. The connection may be through any connector which is attached to sheath 42 for connection to the drive coupling 60. The sheath 42, the connector 44 and casing 62 provide a covering for the flexible shaft 40 and rigid drive shaft 64 so that the drive train shaft can be safely handled. As shown in FIG. 2, the flexible shaft 40 may have a male end for engagement with a female end 64a of the rigid shaft 64. The connector 44 may be threadably attached to the drive coupling 60 by means of threads 46 in the connector 44 and threads 74 on the outer surface of the casing 62. Connector 44 could also be attached to casing 62 in other manners. It is understood that the male member may alternatively be a part of the drive coupling 60 for engagement with a female member attached to the end of the flexible shaft 40.

At the other end of the rigid shaft 64 is a driving engagement or chuck member 76. The chuck member 76 is for driving engagement with the drive member of the power tool coupling 100 and is preferably a female member or socket so that there is no exposed member in the drive train when the coupling 50 is not connected. In other words, when the motor is operating the chuck member 76 may be rotating but is safely within the casing 62 when the power tool is not connected.

At the other or second end 60b of the driving coupling 60 the casing 62 has a female attachment and detachment member 80. The female member 80 is preferably a part of casing 62 although alternately it may be a separate piece which is attached to the casing 62. The female attachment and detachment member 80 preferably has at least one and preferably a plurality of openings 82 in which are placed balls 84 which are spring biased or loaded by spring 85 and spring biasing member 86. Spring 85 and spring biasing member 86 are held in place by ring 87. The ball or balls 84 will provide for quick connection and locking with a male member of the power tool coupling 100 as will be set forth in more detail hereinafter. The female attachment and detachment member 80 has at its outer end and spaced around the circumference at least one and preferably a plurality of lugs 88. The lugs 88 may be closely spaced with a substantial number such as, eight or sixteen in number, or may be spaced such that there are only one, two or four lugs 88. The purpose of the lugs is to restrict rotational motion as will be set forth in more detail hereinafter when the power tool coupling is described.

Figure 9:
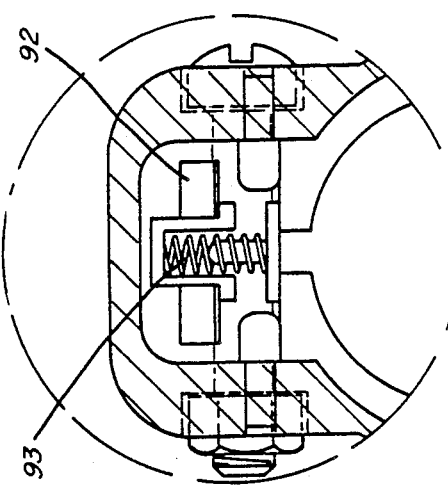
FIG. 9 is a blown-up view of FIG. 8.
Figure 8:
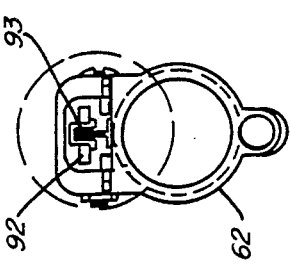
FIG. 8 is a cross-sectional view along the cross-section 8—8 of FIG. 7.

The drive coupling 60 may also include one or more control mechanisms 90. One control mechanism is a kill switch 92. The switch 92 is in operative position only when a person applies some force to the switch making electrical contact so that either the electric motor 30 will be able to continue to provide power or a gasoline engine is not stopped. Details of the switch 92 are shown in FIG. 8 and blown-up in FIG. 9. The switch 92 is urged to the kill or stop position by spring 93. This provides a safety device so that if the drive coupling 60, which is also the portion held in the operators hand, is dropped or otherwise set down the release of switch 92 will stop or deactivate the power train even when a power tool is attached.

Another control mechanism is a throttle 94. The throttle is used to increase the torque delivered by the motor thus increasing the torque of the power train.

Figure 10:
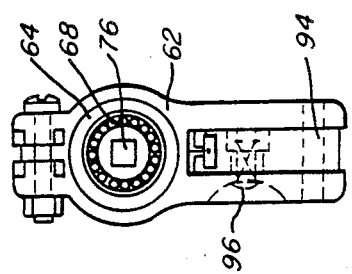
FIG. 10 is a sectional view along line 10—10 of FIG. 7.

Referring again to FIG. 6 and to FIG. 10 a locking spring-loaded pushbutton 96 is shown. Pushbutton 96 must be pressed in order to activate throttle 94. This is a special safety device when more than idle torque is required for the power train to be driven. Before the safety lock 96 is disengaged, the throttle is locked in idle position, causing motor 30 only to idle. During idle, flexible shaft 40 will be disengaged or deactivated from motor 30 via clutch mechanism 32. For the shaft 40 to become engaged, the throttle must be activated so that the torque is sufficient to engage the clutch mechanism 32.

Another control is a self starter 98 which may be attached to the casing 62 of the drive coupling 60. Casing 62 also acts as a handle to be utilized in controlling the power train and power tool. The drive coupling 60 together with the control mechanisms 90 not only provide the power train to the power tool but also safely control the power source to the power tool.

Not all control mechanisms 90 need be utilized in a particular embodiment of the invention disclosed herein. For instance, throttle 94 may be used in combination with kill switch 92 and starter 98. Alternatively, throttle 94 may be used in combination with pushbutton 96. Each of these embodiments gives the operator the ability to selectively deactivate rotational drive to the flexible shaft 40 so that power tools can be attached and detached.

Figure 7:
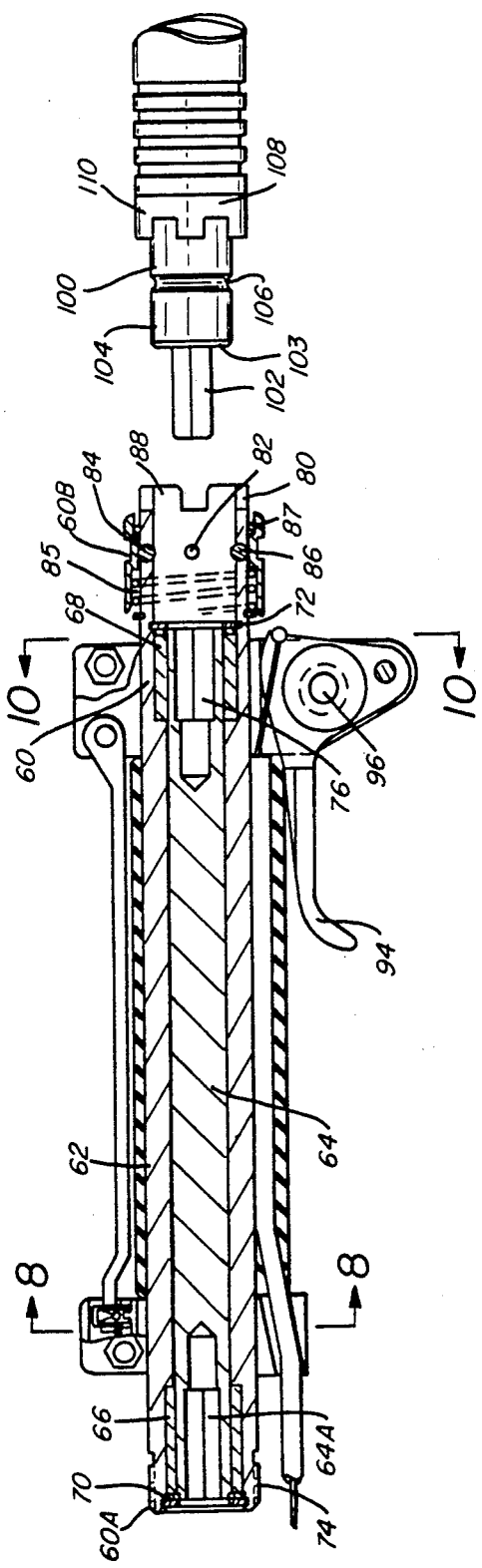
FIG. 7 is a view partly in cross-section of the coupling shown in FIG. 6.

The second portion of the coupling 50 is the power tool coupling 100. The power tool coupling 100 is either a part of the power tool 112, an adaptor or part inserted into and held by the power tool 112 or as shown in FIG. 7 may be an extension member as will be described in more detail hereinafter. The power tool coupling 100 generally includes a drive shaft 102 and a male attachment and detachment member 104. The male member 104 as shown is a body insertable into the female member 80 of drive coupling 60. Drive shaft 102 extends axially through a bore 103 (not shown) in male member 104. Male member 104 may also include a bearing for drive shaft 102. The dimensions are such that the end of drive shaft 102 is insertable into the female chuck member 96 for driving engagement. The outer surface of male member 104 has a groove 106 positioned such that when the male member is in the female member 80, the balls 84 will align and lock in groove 106. The balls and groove provide for a quick attachment and quick detachment between the drive coupling 60 and the power tool coupling 100.

The power tool coupling 100 has a shoulder 108 which is fixably attached or a part of the power tool 112. The shoulder 108 restricts axial motion in one direction between drive coupling 60 and power tool coupling 100. The shoulder 108 may have a smooth surface (not shown) which will permit rotation of the power tool 112 as compared to the drive coupling 60. Preferably, however, member 108 has at least one but preferably a plurality of lugs 110 which are equal and opposite to the lugs 88 at the end of the drive coupling 60. The meshing or interlocking of lugs 88 with lugs 110 maintains the power tool 112 in a rotationally restricted or fixed position relative to the drive coupling 60 and therefore relative to the hand position of the user. As an example, if the power tool 112 was a sander, a smooth shoulder would be desired so that there would be some radial movement within the connection. On the other hand, if the power tool 112 was a saw, a rigid connection would be desired and shoulder 108 with the lugs 110 would be used. The power tool 112 however may be changed in position by quickly releasing the drive coupling 60 from the power tool coupling 100, rotating the tool 112 and reinserting for interlocking of the matching lugs 88 and 110 at another position.

Figure 11:
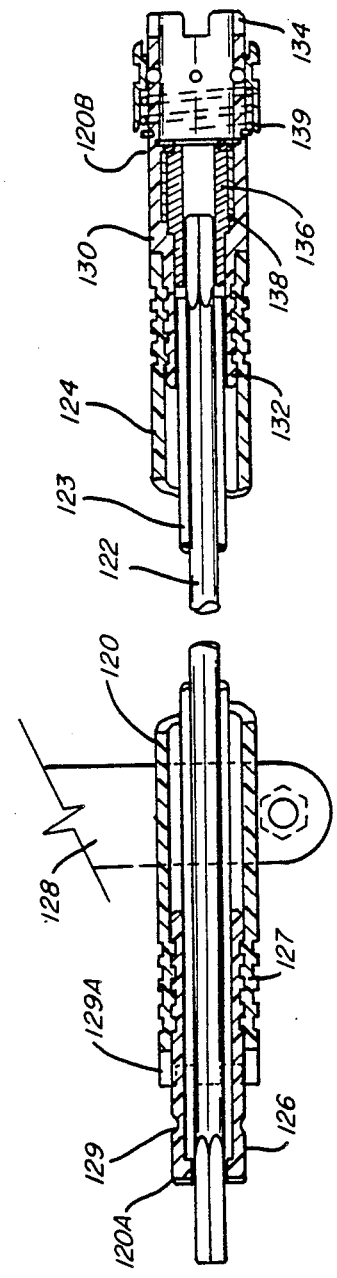
FIG. 11 is a cross-sectional view of an extension member of the present invention.

Referring now to FIG. 11, an extension assembly 120 may also be utilized with the coupling 50. The extension member 120 provides for an extended rigid connection between the casing 62 and the power tool 112. This extension member 120 will be useful for hard to reach jobs such as when sawing an upper limb off of a tree.

The extension member 120 with first end 120a and second end 120b generally includes shaft 122, casing 124, male attachment and detachment member 126 and bridge coupling member 130. Bridge coupling member 130 generally includes female attachment and detachment member 134 and bridge engaging member 136.

Shaft 122 may be rigid or flexible and is covered by a tube 123. Tube 123 is covered by casing 124. A bar 128 may be attached to the extension casing 124 to aid in grasping the extension casing and in controlling the power tool 112. The dimensions are such that one end of shaft 122 is insertible into female chuck member 76 and the other end is insertible into bridge engaging member 136. In other words, both ends of shaft 122 are for driving engagement and are similar to or preferably the same as the end of drive shaft 102.

Extension member 120 also includes a male attachment and detachment member 126 at the first end 120a. The male member 126 as shown is a body insertible into the female member 80 of drive coupling 60. Male member 126 may be a part of casing 124 or as shown may be compressed into casing 124 and held in place by one or more ridges 127. Male member 126 and casing 124 could be attached by any other well known means such as threading. Male member 126 may also include a bearing for shaft 122. The outer surface of male member 126 has a groove 129 positioned such that when the male member 126 is in female member 80, the balls 84 will align and lock in groove 129. The balls and groove provide for quick attachment and quick detachment between the drive coupling 60 and the extension member 120. Casing 124 at first end 120a acts as a shoulder with lugs 129a which is similar to or preferably the same as shoulder 108 for restricting rotational motion between extension member 120 and drive coupling 60. The shoulder 129a could also be a separate piece. It is apparent that first end 120a of extension member 120 is similar to or preferably the same as power tool coupling 100 and hence can act as such with the extension member 120 becoming the driven device.

The other end of extension casing 120 is attachable to bridge coupling member 130. Bridge coupling member 130 is compressed into extension casing 124 and held in place by one or more ridges 132. Bridge coupling member 130 and extension casing 124 could be attached by any other well known means such as threading.

Bridge coupling 130 includes a female attachment and detachment member 134 which is similar to or preferably the same as the female attachment and detachment member 80 including openings, balls, a spring, a spring biasing member, a ring and lugs (not numbered). Female member 134 is to be utilized for connection to the male attachment and detachment member 104 of the power tool coupling 100 with the lugs restricting rotational motion between these two members.

Bridge engaging member 136 is a tube with an inner surface shaped for driving engagement with shaft 122 and drive shaft 102. Bearing 138 allows bridge engaging member 136 to rotate freely within bridge coupling member 130. Bearing 138 is preferably a "torrington" bearing. Bridge engaging member 136 is retained within bridge coupling member 130 by retainer 139. Retainer 139 is preferably a "truarc" retainer Bridge engaging member 136 is preferably female so that there is no exposed member in the drive train when the power tool 112 is not connected. Bridge engaging member 136 is needed to bridge the engagement between shaft 122 and drive shaft 102 since the diameter of shaft 122 is the same as, or substantially the same as, the diameter of drive shaft 102.

It will be appreciated that bridge coupling 130 could be eliminated by including a female attachment and detachment member at the second end of extension casing 124 and a chuck member at the second end of shaft 122 by increasing the diameter at the second end of a shaft 122 or by increasing the diameter of the entire shaft 122 except at the first end. The important feature is that either this structure or the structure of bridge coupling 130 enables extension member 120 when attached at first end 120a to function as drive coupling 60.

Figure 12:
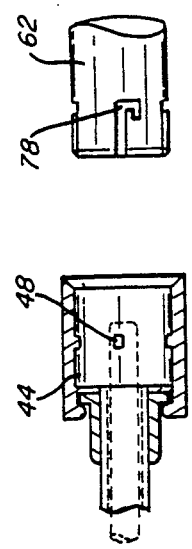
FIG. 12 is an alternative embodiment of the connector shown in FIG. 6.

Referring now to FIG. 12, an alternative embodiment for attachment of connector 44 to casing 62 is shown. Connector 44 is shown with a plurality of internal prongs 48 for connection to casing 62 in hooked channel 78 on the outer surface of the casing 62.

It is to be understood that the invention disclosed herein may have other modifications than those specifically shown or described without departing from the spirit of the invention. For instance, any external rotating source could serve as the power unit or motor 30. It will also be appreciated that the rigid shaft 64 within casing 62 may be eliminated by having the flexible shaft 40 run into the casing 62 and act as the chuck member 76. In other words, the male engagement end of flexible shaft 40 may be eliminated and substituted by chuck member 76. With respect to FIG. 7 it will also be appreciated that some of the details may be reversed such as, for example, the balls 84 may be within the body 104 and the groove 106 may be within the female attachment and detachment member 80.

We claim:

1. Portable apparatus carried on the back of an operator for operating quickly attachable and detachable power tools, comprising:
   a backpack;
   a power unit mounted on said backpack;
   a flexible shaft connected at one end to said power unit;
   a quick attach and detach drive coupling means at the other end of said flexible shaft from said power unit;
   said drive coupling means including driving engagement means driven by said flexible shaft;
   a driven device including a quick attach and detach driven coupling means; said driven coupling means including an engaging means adapted for interlocking with said driving engagement means and for driving said driven device;
   said drive coupling means and said driven coupling means including a male attachment and detachment means and a female attachment and detachment means, wherein one of said attachment and detachment means is located on said drive coupling means and the other is located on said driven coupling means, and including at least one spring loaded locking ball located in one of said attachment and detachment means for attachment to and detachment from a groove located on the other of said attachment and detachment means.

2. Portable apparatus according to claim 1 wherein said backpack includes a pivotal mounting means whereby said power unit is pivotally mounted on said backpack.

3. Portable apparatus according to claim 2 wherein said pivotal mounting means comprises:
   a lower support attached to said backpack;
   a plate on said lower support;
   a finger-flex member which seats on said plate for pivoting said power unit;
   an L-shaped bracket attached to said power unit on a vertical portion of said L-shaped bracket and seated on said finger-flex member on a horizontal portion of said L-shaped bracket; and a pin for pivotally pinning said finger-flex member, said plate and said lower support together.

4. Portable apparatus according to claim 1, wherein said drive coupling means includes:

at least one control mechanism connected to said flexible shaft including a deactivation means whereby rotational drive to said flexible shaft may be selectively deactivated.

5. Portable apparatus according to claim 4, wherein said deactivation means comprises a throttle which is selectively locked in an idling position when released and wherein said power unit includes a clutch mechanism to which said flexible shaft is connected, said clutch mechanism including disengaging means such that when said power unit is idling, said flexible shaft will not be driven by said power unit.

6. Portable apparatus according to claim 4, wherein said deactivation means comprises a kill switch for deactivating said power unit when said kill switch is released.

7. Portable apparatus according to claim 1, wherein said driven device is a power tool.

8. Portable apparatus according to claim 1, wherein said driven device is an extension member for extending rotational drive to a power tool including power tool coupling means.

9. Portable apparatus according to claim 8, wherein said extension member comprises:

an attachment and detachment means at a first end for attachment to said attachment and detachment means of said drive coupling means;

restrictive means wherein said restrictive means restricts rotational motion of said shaft extension member relative to said attachment and detachment means on said drive coupling means;

a second attachment and detachment means located at a second end for attachment to said attachment and detachment means of said driven coupling means, said second attachment and detachment means including second restrictive means for selectively restricting rotational motion relative to said driven coupling means; and a shaft within said extension casing having engaging means at a first end for interlocking with said driving engagement means and engaging means located at a second end for interlocking with said engaging means on said driven coupling means.

10. Portable apparatus according to claim 1, wherein said driven device is a power tool selected from the group consisting of a saw, an edger, a drill, a blower, a trimmer, a buffer and a sander.

11. Portable apparatus according to claim 1, wherein said attachment and detachment means on said drive coupling means includes at least one lug protruding from an end of said attachment and detachment means.

12. Portable apparatus according to claim 11, further comprising a shoulder adjacent to said attachment and detachment means on said driven coupling means for terminating axial movement in one direction between said drive coupling means and said driven coupling means, said shoulder including at least one lug protruding from one end of said shoulder, said lug being adapted for meshing with said lug on said drive coupling means attachment and detachment means for restricting rotational motion of said drive coupling attachment and detachment means relative to said driven device.

13. Portable apparatus carried on the back of an operator for operating quickly attachable and detachable power tools, comprising:

a backpack;

a power unit mounted on said backpack;

a flexible shaft connected at one end to said power unit;

a quick attach and detach drive coupling means at the other end of said flexible shaft;

said drive coupling means including a shaft driven by an external rotating power source, driving engagement means driven by said shaft and female attachment and detachment means having at least one spring loaded locking ball and at least one lug protruding from an end of said female attachment and detachment means; and a quick attach and detach power tool coupling means including an engaging means adapted for interlocking with said driving engagement means and for driving the power tool and male attachment and detachment means external to said engaging means, said male attachment attachment means includes a clutch merchant having at least on groove for locking with said locking ball.

14. Portable apparatus according to claim 13, wherein said backpack includes a pivotal mounting means whereby said power unit is pivotally mounted on said backpack.

15. Portable apparatus according to claim 13 wherein said drive coupling means includes at least one control mechanism connected to said flexible shaft including a deactivation means comprising a throttle which is selectively locked in an idling position when released and wherein said power unit includes a clutch mechanism to which said flexible shaft is connected, said clutch mechanism including disengaging means such that when said power unit is idling, said flexible shaft will not be driven by said power unit.

16. Portable apparatus according to claim 15, wherein said at least one control mechanism comprises:

a handle for controlling the driven device;

a throttle on said handle for adjusting the torque delivered by the power unit; and deactivation means whereby said shaft may be selectively deactivated from rotational drive.

17. Portable apparatus according to claim 13, wherein said drive coupling means includes at least one control mechanism connected to said flexible shaft including a deactivation means comprising a kill switch for deactivating said power unit when said kill switch released.

18. Portable apparatus according to claim 13, further comprising a shoulder adjacent to said male attachment and detachment means for terminating axial movement in one direction between said drive coupling means and said power tool coupling means, said shoulder including at least one lug protruding from one end of said shoulder, said tub being adapted for meshing with said lug on said female attachment and detachment means for restricting rotational motion o f said female attachment and detachment means relative to said male attachment and detachment means.

19. Portable apparatus according to claim 13, further compressing an extension member, said extension member including:

an attachment and detachment means at a first end for attachment to said attachment and detachment means of said drive coupling means;

restrictive means wherein said restrictive means restricts rotational motion of said shaft extension member relative to said attachment and detachment means on said drive coupling means;

a second attachment and detachment means located at a second end for attachment to said attachment and detachment means of said driven coupling means, said second attachment and detachment means including second restrictive means for selectively restricting rotational motion relative to said driven coupling means; and a shaft within said extension casing having engaging means at a first end for interlocking with said driving engagement means and engaging means located at a second end for interlocking with said engaging means on said driven coupling means.

20. Portable apparatus carried on the back of an operator for operating quickly attachable and detachable power tools, comprising:

a backpack;

a power unit mounted on said backpack;

a flexible shaft connected at one end to said power unit;

a quick attach and detach drive coupling means at the other end of said flexible shaft;

said drive coupling means including a shaft driven by an external rotating power source, a driving engagement means driven by said shaft, female attachment and detachment means having at least one spring loaded locking ball and at least one lug protruding from an end of said female attachment and detachment means and at least one control mechanism connected to said flexible shaft including a deactivation means whereby rotational drive to said flexible shaft may be selectively deactivated; and a quick attach and detach power tool coupling means including an engaging means adapted for interlocking with said driving engagement means and for driving the power tool; and male attachment and detachment means external to said engaging means, said male attachment and detachment means having at least one groove for locking with said locking ball.

* * * * *